(12) United States Patent
Igarashi et al.

(10) Patent No.: US 9,184,792 B2
(45) Date of Patent: Nov. 10, 2015

(54) CHARGING COMMUNICATION SYSTEM AND CHARGING EQUIPMENT

(71) Applicant: Mitsubishi Electric Corporation, Tokyo (JP)

(72) Inventors: Yuji Igarashi, Tokyo (JP); Takashi Tamada, Tokyo (JP); Yoichi Okubo, Tokyo (JP); Takanori Matsunaga, Tokyo (JP); Kazushi Shirasawa, Tokyo (JP); Hiroyuki Kumazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/386,255

(22) PCT Filed: Apr. 1, 2013

(86) PCT No.: PCT/JP2013/059917
§ 371 (c)(1),
(2) Date: Sep. 18, 2014

(87) PCT Pub. No.: WO2013/151007
PCT Pub. Date: Oct. 10, 2013

(65) Prior Publication Data
US 2015/0043662 A1    Feb. 12, 2015

(30) Foreign Application Priority Data
Apr. 5, 2012   (JP) .................. 2012-086260

(51) Int. Cl.
*H04L 25/00* (2006.01)
*H02J 7/00* (2006.01)
(Continued)

(52) U.S. Cl.
CPC . *H04B 3/54* (2013.01); *B60L 11/14* (2013.01); *B60L 11/18* (2013.01); *B60L 11/184* (2013.01);
(Continued)

(58) Field of Classification Search
CPC ..... Y02E 60/12; H02J 7/0054; H04L 25/0272
USPC .......................... 375/257; 320/103, 105, 109
See application file for complete search history.

(56) References Cited

U.S. PATENT DOCUMENTS

| 8,700,941 B2 | 4/2014 | Katou |
| 2012/0029728 A1 | 2/2012 | Hirayama et al. |

(Continued)

FOREIGN PATENT DOCUMENTS

| JP | 2007 221356 | 8/2007 |
| JP | 2009 42822 | 2/2009 |

(Continued)

OTHER PUBLICATIONS

International Search Report Issued Jun. 18, 2013 in PCT/JP13/059917 Filed Apr. 1, 2013.

(Continued)

*Primary Examiner* — Khai Tran
(74) *Attorney, Agent, or Firm* — Oblon, McClelland, Maier & Neustadt, L.L.P.

(57) ABSTRACT

In a charging communication system in which a charging control device performs communication between an electric vehicle and a charging equipment, the electric vehicle is equipped with a first communication device and a second communication device both configured to communicate with the charging equipment by using the same signal line in the charging cable; and a signal line connection device configured to switch connection/disconnection between the second communication device and the signal line. The charging control device, which controls a battery on the electric vehicle, calculates an amount of change in a signal line voltage between before and after the signal line connection device connects the second communication device to the signal line, and the charging control device causes, when the amount of change does not fall within a predetermined allowable range, the signal line connection device to disconnect the second communication device from the signal line.

18 Claims, 6 Drawing Sheets

(51) Int. Cl.
*H04B 3/54* (2006.01)
*B60L 11/14* (2006.01)
*B60L 11/18* (2006.01)
*H01M 10/44* (2006.01)
*H01M 2/10* (2006.01)
*H02J 13/00* (2006.01)
*H04L 25/02* (2006.01)

(52) U.S. Cl.
CPC ......... *B60L 11/1816* (2013.01); *B60L 11/1844* (2013.01); *B60L 11/1846* (2013.01); *H01M 2/10* (2013.01); *H01M 2/1083* (2013.01); *H01M 10/44* (2013.01); *H02J 7/00* (2013.01); *H02J 13/00* (2013.01); *H04L 25/0264* (2013.01); *B60L 2240/80* (2013.01); *B60L 2270/142* (2013.01); *H01M 2220/20* (2013.01); *Y02E 60/721* (2013.01); *Y02T 10/70* (2013.01); *Y02T 10/7005* (2013.01); *Y02T 10/7077* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 2012/0109409 | A1* | 5/2012 | Hara | 701/1 |
| 2012/0128081 | A1 | 5/2012 | Hikihara et al. | |
| 2013/0335024 | A1* | 12/2013 | Akai et al. | 320/109 |

FOREIGN PATENT DOCUMENTS

| | | |
|---|---|---|
| JP | 2012 34484 | 2/2012 |
| WO | 2010 131305 | 11/2010 |
| WO | 2011 016466 | 2/2011 |

OTHER PUBLICATIONS

International Preliminary Report of Patentability and Written Opinion issued Oct. 16, 2014 in PCT/JP2013/059917 (with English translation).

Office Action issued Mar. 3, 2015 in Japanese Patent Application No. 2014-509155 (with English translation).

Office Action issued Jul. 21, 2015 in Japanese Patent Application No. 2014-509155 (with English translation).

* cited by examiner

F I G. 3
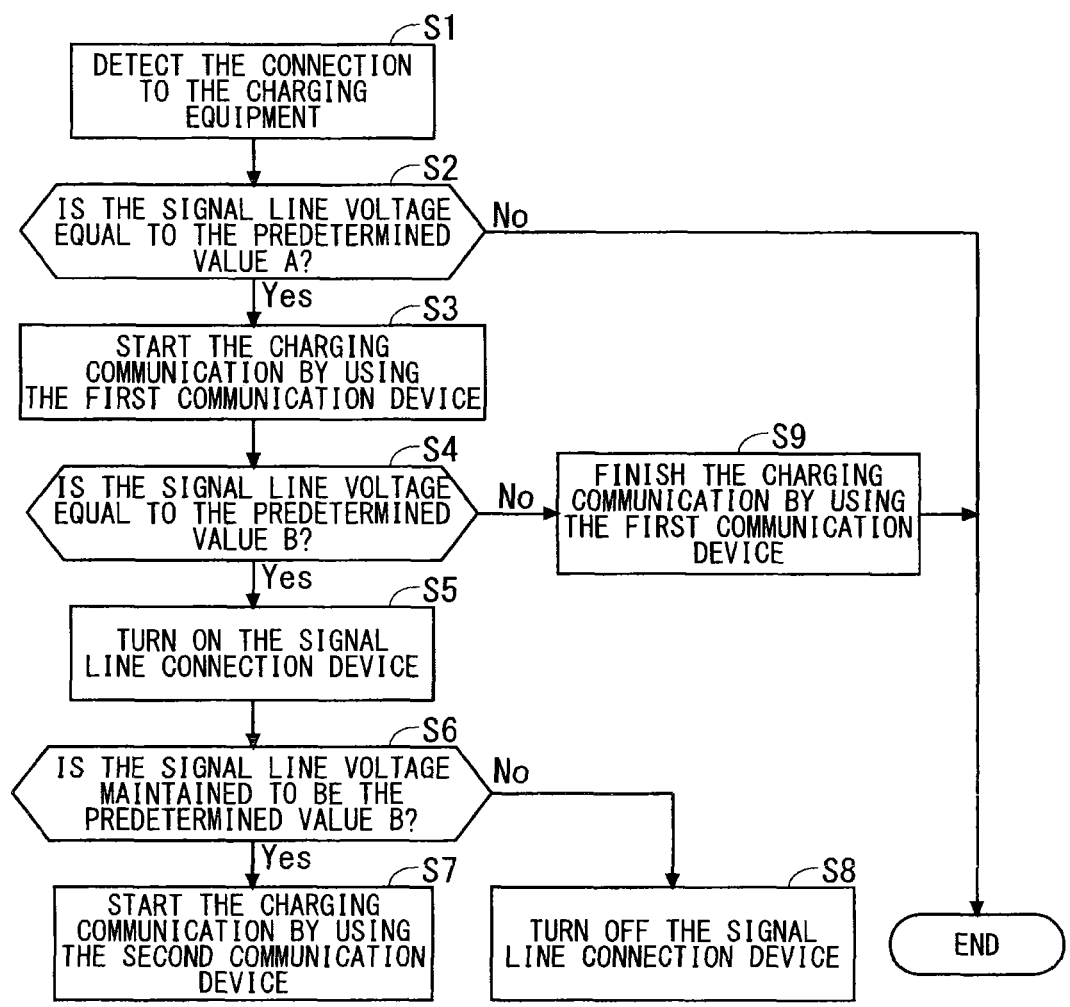

CHARGING COMMUNICATION SYSTEM AND CHARGING EQUIPMENT

TECHNICAL FIELD

The present invention relates to a charging control device having a communication function using a cable for charging a battery and to a charging communication system using the charging control device.

BACKGROUND ART

In recent years, from the point of view of reducing carbon dioxide emissions and increasing energy utilization efficiency, electric vehicles using electricity as a power source have been put into practical use. Accordingly, charging infrastructure for electric vehicles has been started to be built in various places. In order to fully charge a battery for a common electric vehicle, electricity amount of as much as 10 kWh (amount for two or three days in terms of an average power consumption of an average family) is needed. For this reason, in the field of an electric power supply facility (grid) for electric vehicles, it is an issue to enhance functions such as a load control function and distribution control function, and the next-generation power network called a "smart grid" embedded with a means for automatically controlling demand and supply of electric power is gathering attention. In the field of a power network managed by a smart grid, a demand forecast of charging (power supply from the grid to the vehicle) of an on-board battery and a charging control based on the forecast are taken into consideration.

As electric vehicles spread, it is becoming common practice to install in a household a charging equipment capable of charging an on-board battery. As a charging equipment, examples include outdoor outlets, circuit breakers, distribution boards, and the like dedicated for charging a battery. In these charging equipments, the maximum value of a chargeable electric current value is extended to 30 A or higher in accordance with a charging specification of an electric vehicle (the maximum value is approximately 15 A in the case of existing home circuit breakers).

On the other hand, the charging specification (the maximum value, the minimum value, and the like of a chargeable current and voltage) of an electric vehicle depends on types of vehicles, and the value of the electric current flowing through the charging cable when charging the battery is determined on the side of the charging device on the vehicle; thus, it is difficult for one charging equipment to satisfy charging specifications of various electric vehicles. In addition, the fact that the specification (including a value of a current flowing through a circuit breaker installed in a household) of the charging equipment is limited by regulations that vary according to nations and local governments makes the issue more difficult.

To solve this issue, a technique is proposed in which the charging equipment informs the electric vehicle of the value of a suppliable electric current. The techniques include, for example, communication using a control pilot signal defined in IEC61851 (hereinafter, referred to as a "control pilot communication") and communication using the communication protocol developed by CHAdeMO Association ("CHAdeMO" is a proprietary name). In these techniques, in the charging cable connecting the electric vehicle and the charging equipment, there is provided a signal line (communication line) for communication in addition to the power line for charging the battery, and the communication is performed between the charging equipment and the electric vehicle through the signal line.

The control pilot communication provides an arrangement in which a signal line voltage and a duty ratio of a PWM (Pulse Width Modulation) signal are used to inform not only connection/disconnection of the charging cable but the value of the suppliable electric current from the charging equipment to the electric vehicle. The communication protocol developed by the CHAdeMO Association ("CHAdeMO" is a proprietary name) provides an arrangement in which CAN (Controller Area Network) communication is used not only to inform the electric vehicle of the value of the electric current suppliable from the charging equipment but to inform the charging equipment of an upper limit (withstand voltage) of a voltage chargeable from the electric vehicle, a filling rate of the battery, and the like.

However, the control pilot communication and CAN communication have limitations in a communication speed and a volume of data to be transmitted at a time (for example, CAN communication can transmit only 8 bytes of data at a time). Thus, it is difficult to realize a use case considered for the smart grid (for example, the communication of billing information between the electric vehicle and the charging equipment, and the provision of a power generation schedule from the system side to the electric vehicle).

To address this issue, in recent years, it is being studied that PLC (Power Line Communication) communication as disclosed in Patent Document 1 is performed on the power line of the charging cable to perform the communication between the charging equipment and the electric vehicle. PLC communication realizes communication on the commercial alternating-current power line of 100 V (volt) or 200 V, and can transmit and receive a greater amount of data than the control pilot communication and CAN communication.

However, the power line which serves as a communication path for PLC communication is branched on a switchboard in a household and is connected to other appliances such as an air conditioner and a refrigerator. Thus, noise created by an inverter in an air conditioner in a house, for example, can reach the charging cable connected to the charging equipment in the same house. If the noise reaches the charging cable, the PLC communication using the charging cable cannot be normally performed. Also, the power line in the house is connected to a neighboring house through the outdoor power line. Thus, in the PLC communication, for example, there may a problem of communication leak that a charging equipment in a house erroneously communicates with an electric vehicle connected to a charging equipment in a neighboring house, and there may be a problem of leakage electric field, from an outdoor power line, caused by communication.

As a result, when configuring a system performing PLC communication between the electric vehicle and the charging equipment, a wiring plan of power lines is needed to be made, taking a leakage of communication and a leakage electric field into account.

PRIOR ART DOCUMENT

Patent Document

Patent Document 1: International Publication No. 2011/016466

SUMMARY OF INVENTION

Problems to be Solved by the Invention

In view of the above background, as a communication method between an electric vehicle and a charging equipment, when considering the operation, it is preferable to use a physically closed signal line such as the control pilot communication and CAN communication. In particular, when considering a cost for newly providing a signal line and securing the interconnection (securing a wire connection) between the electric vehicle and the charging equipment, a communication method using an existing signal line is preferable.

When different types of two communications are superposed on an existing signal line, a new communication device (second communication device) is connected to the existing signal line in addition to an existing communication device (first communication device). When this arrangement is viewed from the first communication device, this arrangement is equivalent to the change in impedance (resistance) of the signal line. Thus, a voltage applied to the signal line by the first communication device does not have an expected value, and the existing communication by the first communication device may not be normally performed.

The present invention has been made to solve the above problems, and an object of the present invention is to prevent malfunction of the communication from being caused by an arrangement in which a plurality of communication devices for different communication methods are connected to the same signal line in the charging communication system in which the communication is performed between the electric vehicle and the charging equipment by the charging control device using the signal line in the charging cable.

Means for Solving the Problems

A charging communication system according to a first aspect of the present invention includes: an electrically powered vehicle having a battery thereon; a charging equipment configured to be able to charge the battery; and a charging cable configured to be connected between the electrically powered vehicle and the charging equipment when charging the battery, wherein the electrically powered vehicle includes: a first communication device configured to perform communication with the charging equipment by a first communication method by using a signal line in the charging cable; a second communication device configured to perform communication with the charging equipment by a second communication method by using the signal line; a signal line connection device configured to switch connection/disconnection between the second communication device and the signal line; and a control device configured to calculate an amount of change in a signal line voltage which is a voltage on the signal line between before and after the signal line connection device connects the second communication device to the signal line, and to cause the signal line connection device to disconnect the second communication device from the signal line when the calculated amount of change is not within a predetermined allowable range.

A charging communication system according to a second aspect of the present invention includes: an electrically powered vehicle having a battery thereon; a charging equipment configured to be able to charge the battery; and a charging cable configured to be connected between the electrically powered vehicle and the charging equipment when charging the battery, wherein the electrically powered vehicle includes: a first communication device configured to perform communication with the charging equipment by a first communication method using a duty ratio of a signal by using a signal line in the charging cable; a second communication device configured to perform communication with the charging equipment by a second communication method by using the signal line; a signal line connection device configured to switch connection/disconnection between the second communication device and the signal line; and a control device configured to calculate an amount of change in a signal line voltage which is a voltage on the signal line between before and after the signal line connection device connects the second communication device to the signal line, and to cause the signal line connection device to disconnect the second communication device from the signal line when the calculated amount of change is not within a predetermined allowable range.

Effects of the Invention

According to the charging communication system according to the present invention, the second communication device is connected to the signal line only in the case that the signal line voltage or the signal duty ratio is maintained even if the second communication device is connected to the signal line used for the communication of the first communication device. Thus, the normal communication by the first communication device can be maintained.

BRIEF DESCRIPTION OF DRAWINGS

FIG. 3 is a flowchart showing an operation of the charging control device according to Embodiment 1.

DESCRIPTION OF EMBODIMENTS

<Embodiment 1>

Figure 1:
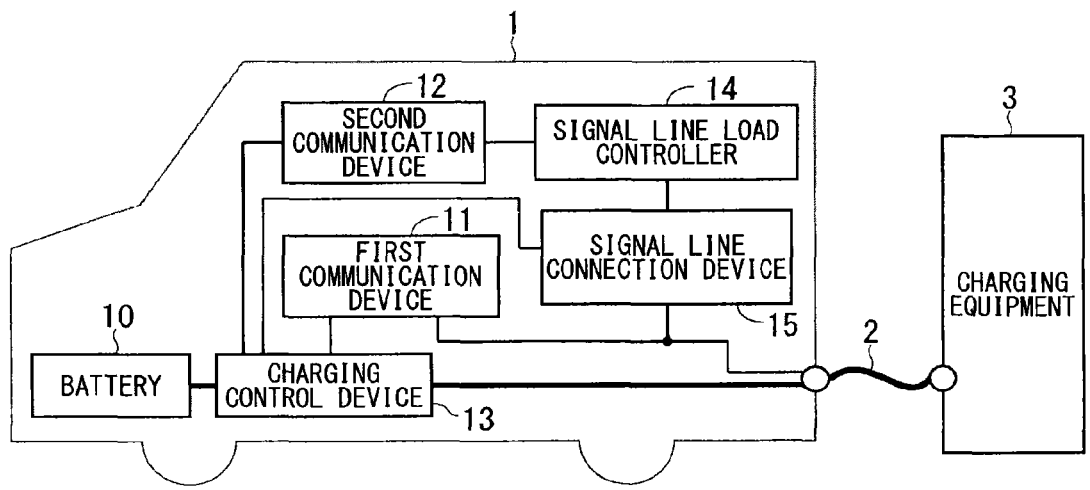
FIG. 1 is an entire configuration diagram of a charging communication system according to Embodiment 1.

FIG. 1 is a diagram showing a configuration of a charging communication system according to Embodiment 1. An electric vehicle 1 (electrically powered vehicle) is equipped with a battery 10, a first communication device 11, a second communication device 12, a charging control device 13, a signal line load controller 14, and a signal line connection device 15. When the battery 10 is charged, the electric vehicle 1 is connected to the charging equipment 3 through a charging cable 2 as shown in FIG. 1. In the present invention, the electric vehicle 1 is not limited to a vehicle only having as a power source a motor driven by electricity from a battery, and the electric vehicle 1 may be, for example, a plug-in hybrid vehicle in which a motor and a gasoline engine are used in combination.

The first communication device 11 and the second communication device 12 equipped in the electric vehicle 1 each perform different types of communication with the charging equipment 3, and both use the same signal line in the charging cable 2 as a communication path.

Although not shown in the drawings, the charging equipment 3 is equipped with both of a means for communicating with the first communication device 11 and a means for communicating with the second communication device 12 so that the charging equipment 3 can communicate with both of the first communication device 11 and the second communication device 12 of the electric vehicle 1. However, the charging equipment 3 has only the means for communicating with the first communication device 11 in some cases, and the charging control device 13 is configured to be able to also deal with such a charging equipment 3, as described later.

Here, a communication method (a first communication method) of the first communication device 11 is a communication (control pilot communication) using a signal line in the charging cable 2 and the control pilot signal defined in IEC61851. In the control pilot communication, by controlling the voltage on the signal line (signal line voltage), the electric vehicle 1 and the charging equipment 3 mutually detect their connection through the charging cable 2, and the electric vehicle 1 informs the charging equipment 3 that the battery 10 has become ready to be charged.

In the control pilot communication, a communication by the PWM (Pulse Wide Modulation) method is also performed through the same signal line, and the suppliable maximum value (maximum supply current value) of the current supplied by the charging equipment 3 is informed from the charging equipment 3 to the electric vehicle 1 by the signal duty ratio. These pieces of information which the first communication device 11 obtains from the charging equipment 3 are the minimal information needed for the charging control device 13 to charge the battery 10. Hereinafter, the communication performed by the first communication device 11 is occasionally referred to as a "first communication."

Here, the above the "voltage on the signal line (signal line voltage)" corresponds to an L (Low) level voltage of the signal of the PWM communication and is different from a "signal voltage" indicating the voltage level of the signal referencing the signal line voltage.

A communication method (a second communication method) of the second communication device 12 performs a spread spectrum communication such as OFDM by using the signal line (the existing signal line for the control pilot communication) in the charging cable 2 in a similar manner to the first communication device 11, and the second communication device 12 uses a frequency range (for example, some hundreds KHz to MHz) not interfering a signal at the frequency used by the first communication device 11. The information which the second communication device 12 obtains from the charging equipment 3 is the information used for making a charging schedule for reducing charging cost of the battery 10 such as electric price information (for example, information such as "X o'clock X min to Y o'clock Y min: Z yen for 1 W (watt)"). Hereinafter, the communication performed by the second communication device 12 is occasionally referred to as a "second communication."

The charging control device 13 controls a charging operation for accumulating in the battery 10 the electric power supplied from the charging equipment 3 through a power line of the charging cable 2, and the operation is defined based on the various types of information which the first communication device 11 and the second communication device 12 have obtained.

As described above, the first communication device 11 has obtained the minimal information for charging the battery 10. Thus, the charging control device 13 can charge the battery 10 if the charging control device 13 has at least the information obtained by the first communication device 11. That is to say, the charging control device 13 can charge the battery 10 if the charging control device 13 can detect the connection to the charging equipment 3 through the first communication device 11 and can obtain the maximum supply current value of the charging equipment 3. However, the operation of the charging control device 13 in this case is a basic operation in which the battery 10 is continuously charged after the electric vehicle 1 is connected to the charging equipment 3 and until a charging rate of the battery 10 reaches 100% (the state at which no more charging is possible), and reduction in charging cost is not considered.

When the charging control device 13 obtains the electric price information obtained by the second communication device 12 in addition to the minimal information for charging the battery 10 obtained by the first communication device 11, the charging control device 13 can perform an advanced charging operation in which charging cost can be reduced by preferentially selecting low-priced electric power to charge the battery 10 (for example, charging is performed by selecting the time when the electric price for 1 W is a predetermined price or lower).

The second communication device 12 communicate using the same signal line (the signal line for the control pilot communication) as the first communication device 11, and the signal line load controller 14 and the signal line connection device 15 intervene between the signal line and the second communication device 12.

The signal line connection device 15 switches connection/disconnection of the second communication device 12 to the signal line, and the operation of the signal line connection device 15 is controlled by the charging control device 13. When the electric vehicle 1 is not connected to the charging equipment 3, the charging control device 13 turns off (disconnects) the signal line connection device 15 so that the second communication device 12 is not connected to the signal line; however, after the electric vehicle 1 is connected to the charging equipment 3, the charging control device 13 turns on (connects) the signal line connection device 15 as needed to connect the second communication device 12 to the signal line.

The signal line load controller 14 is connected between the second communication device 12 and the signal line connection device 15 and changes the load characteristics (resistance, capacitance, and the like connected to the signal line) of the signal line when the second communication device 12 gets connected to the signal line. That is to say, the signal line load controller 14 changes the load characteristics of the signal line depending on the two states, one of which is the state where only the first communication device 11 is connected to the signal line (the state where the signal line connection device 15 is off) and the other of which is the state where the first communication device 11 and the second communication device 12 are both connected (the state where the signal line connection device 15 is on). The signal line load controller 14 compensates the change in the impedance of the signal line which is viewed from the first communication device 11 and is caused by the second communication device 12 being connected to the signal line.

As a specific way of how the signal line load controller 14 changes the load characteristics of the signal line, for example, a particular load circuit (a circuit having a predetermined impedance and a predetermined capacitance) is previously provided on the signal line load controller 14, and the load circuit is connected to the signal line when the signal line connection device 15 is turned on.

Figure 2:
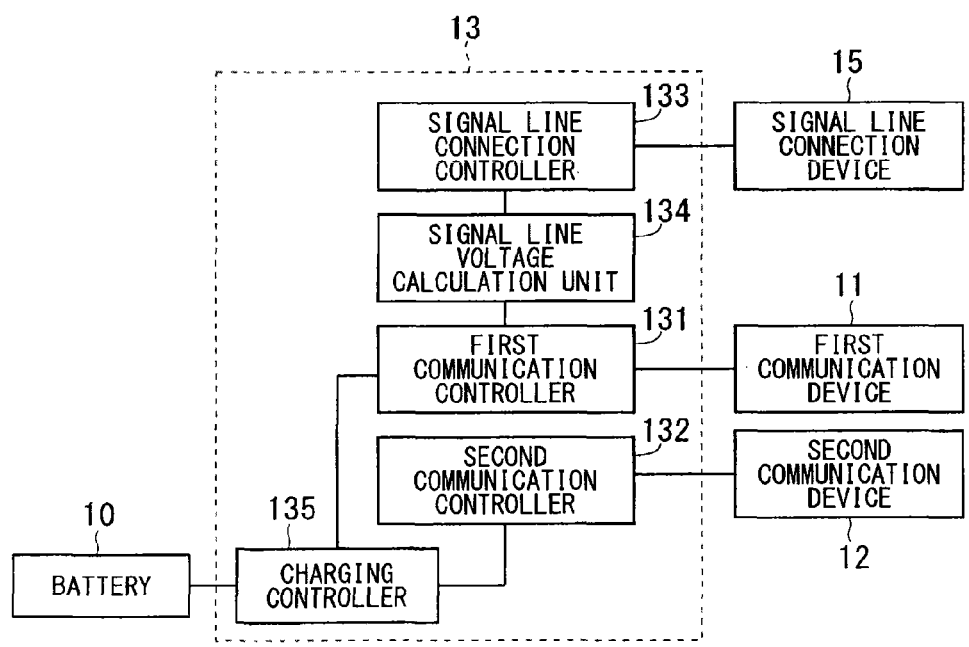
FIG. 2 is a block diagram showing a configuration of a charging control device according to Embodiment 1.

FIG. 2 is a block diagram showing a configuration of the charging control device 13. The charging control device 13 is configured with a first communication controller 131, a second communication controller 132, a signal line connection controller 133, a signal line voltage calculation unit 134, and a charging controller 135.

The first communication controller 131 obtains the state of communication (connection/non-connection of the charging cable 2, possibility of charging the battery 10, and the like) of the first communication device 11 and instructs the change of the state of communication (instruction of change of the signal line voltage). In addition, the first communication controller 131 can also obtain a voltage (signal voltage) and waveform information (signal waveform information) of the signal used for communication (first communication) of the first communication device 11.

The signal waveform information which the first communication controller 131 can obtain includes a signal duty ratio, a time length when the signal keeps H (High) level (H-level time), a time length when the signal keeps L-level (L-level time), a time needed for the signal to transit from L-level to H-level (rise time), a time needed for the signal to transit from H-level to L-level (fall time), and the like.

The second communication controller 132 controls transmission and reception of the signal in the communication (second communication) of the second communication device 12. The second communication controller 132 obtains various types of information such as the electric price information obtained by the second communication device 12.

The signal line connection controller 133 controls on and off of the signal line connection device 15 to switch connection and disconnection of the second communication device 12 to the signal line. When the signal line connection device 15 is turned on and the second communication device 12 is connected to the signal line, the signal line voltage calculation unit 134 can predict change in the signal line voltage and can calculate the value of the changed signal line voltage (details will be described later). The charging controller 135 determines, based on the information obtained by the first communication controller 131 and the second communication controller 132, an electric current value when charging the battery 10 and then charges the battery 10.

FIG. 3 is a flowchart showing an operation of the charging control device 13 when the electric vehicle 1 is connected to the charging equipment 3. Based on the drawing, the operation of the charging control device 13 will be described. Below, the communication of the information, performed between the electric vehicle 1 and the charging equipment 3 through the charging cable 2, regarding the charging of the battery 10 is also referred to as "charging communication."

When a user connects the electric vehicle 1 and the charging equipment 3 by using the charging cable 2, the signal line and the power line on the side of the electric vehicle 1 and the signal line and the power line on the side of the charging equipment 3 are connected through the charging cable 2, respectively.

The charging control device 13 monitors the voltage (signal line voltage) on the signal line through the first communication device 11 by using the first communication controller 131 to detect the connection to the charging equipment 3, based on the change in the signal line voltage (step S1). At this time, the charging control device 13 also obtains the value of the signal line voltage from the first communication device 11.

The charging control device 13 checks whether the signal line voltage obtained from the first communication device 11 is equal to a predetermined value A (for example, 9 V) (step S2). The predetermined value A corresponds to a signal line voltage which is supposed to be the voltage in the state in which the signal line to which the first communication device 11 is connected is correctly connected to the signal line on the side of the charging equipment 3 so that the first communication is normally performed. In step S2, if the signal line voltage is within a certain allowable range with respect to the predetermined value A, the signal line voltage is determined to be equal to the predetermined value A. For example, in the case that the predetermined value A is 9 V and the allowable range is ±1 V, if the signal line voltage is 8 V or higher and 10 V or lower, the signal line voltage is determined to be equal to the predetermined value A.

If the signal line voltage is equal to the predetermined value A in step S2, the charging communication (first communication) using the first communication device 11 is started (step S3). Alternatively, if the signal line voltage is different from the predetermined value A, the first communication device 11 cannot normally perform the charging communication, and information needed for performing the charging cannot be obtained; thus, the charging control device 13 finishes the process.

In step S3, the first communication device 11 informs the charging equipment 3 that the battery 10 can be charged. Specifically, the notification is done by the first communication device 11 connecting the load resistance thereof to the signal line to decrease the voltage on the signal line down to a predetermined value B (for example 6 V).

After step S3, the charging control device 13 obtains the signal line voltage again from the first communication device 11 to confirm that the signal line voltage is correctly equal to the predetermined value B (step S4). Also in step S4, if the signal line voltage is within a certain allowable range with respect to the predetermined value B, the signal line voltage is determined to be equal to the predetermined value B. For example, in the case that the predetermined value B is 6 V and the allowable range is ±1 V, if the signal line voltage is 5 V or higher and 7 V or lower, the signal line voltage is determined to be equal to the predetermined value B.

If the signal line voltage is equal to the predetermined value B in step S4, the charging control device 13 turns on the signal line connection device 15 by using the signal line connection controller 133 (step S5). When the signal line connection device 15 is turned on, the second communication device 12 is connected to the signal line through the signal line load controller 14.

On the other hand, if the signal line voltage is not equal to the predetermined value B, the charging control device 13 finishes the charging communication of the first communication device 11 (for example, setting the signal line voltage back to the predetermined value A), and finishes the process (step S9).

When the signal line connection device 15 is turned on and the second communication device 12 is connected to the signal line in step S5, the charging control device 13 obtains the signal line voltage in that state from the first communication device 11, and determines whether or not the signal line voltage is maintained to the above-described predetermined value B (in other words, the signal line voltage before the second communication device 12 is connected to the signal line) (step S6). If the signal line voltage is maintained to the predetermined value B, the charging control device 13 causes the second communication device 12 to start the charging communication (second communication) (step S7).

On the other hand, if the signal line voltage is not maintained to the predetermined value B, the signal line connection device 15 is turned off to disconnect the second communication device 12 from the signal line (step S8). After the second communication device 12 is disconnected from the signal line, the signal line voltage returns to the predetermined value B; thus, the charging communication (first communication) of the first communication device 11 is possible.

Also in step S6, similarly to step S4, if the signal line voltage is within a certain allowable range with respect to the predetermined value B, the signal line voltage is determined to be maintained to the predetermined value B. However, in step S6, a predicted value of the signal line voltage after a lapse of a certain period of time is calculated differently from in steps S2 and S4, and it is determined whether the predicted value is equal to the predetermined value B (within the allowable range or not). The calculation of the predicted value of the signal line voltage is performed by the signal line voltage calculation unit 134 of the charging control device 13.

Below, a specific method of prediction of a change in the signal line voltage (predicted value calculation) in step S6 will be described. The predicted value calculation of the signal line voltage is performed by the signal line voltage calculation unit 134 and repeatedly performed at a predetermined cycle (for example, several nanoseconds to several microseconds) for a certain period of time (for example, 1 to 2 ms) after the signal line connection device 15 is turned on and until the determination whether the signal line voltage (predicted value) is maintained to the predetermined value B.

First, the charging control device 13 calculates a gradient $\lambda$ of a change in voltage per unit time from an actually measured value of the signal line voltage of the first communication device 11. When the measured value of the signal line voltage at time t is V(t), and the measurement cycle is $\Delta t$, the gradient $\lambda$ of the signal line voltage is expressed by the following Expression (1):

$$\lambda = \{V(t) - V(t-\Delta t)\}/\Delta t \qquad \text{Expression (1)}$$

Subsequently, the charging control device 13 calculates a predicted value $V_f$ of the signal line voltage, based on the gradient $\lambda$ at the latest time t, after a certain period of time $T_x$ has elapsed. The predicted value $V_f$ of the signal line voltage is obtained from the following Expression (2).

$$V_f = V(t) + \lambda \cdot T_x \qquad \text{Expression (2)}$$

In the case that an upper limit and a lower limit of an allowable range with respect to the predetermined value B are $V_{max}$ and $V_{min}$, respectively, if the following Expression (3) is satisfied, the signal line voltage is determined in step S6 to be maintained to the predetermined value B.

$$V_{min} < V_f < V_{max} \qquad \text{Expression (3)}$$

Here, that the signal line voltage V satisfies the relationship $V_{min} < V < V_{max}$ is a condition for the first communication device 11 to be able to maintain a normal charging communication.

Here, the above-described time $T_x$ can be a sum of time $T_{d1}$ which is needed for the signal line voltage calculation unit 134 to obtain the value of the signal line voltage from the first communication device 11, time $T_{d2}$ (including a determination time in step S6) which is needed for the signal line voltage calculation unit 134 to calculate the predicted value $V_f$ of the signal line voltage, and the time $T_{d3}$ which is needed for the signal line connection controller 133 to turn off the signal line connection device 15. As a result, time $T_x$ can be defined as the following Expression (4):

$$T_x = T_{d1} + T_{d2} + T_{d3} \qquad \text{Expression (4)}$$

When time $T_x$ is defined as Expression (4), the value of the predicted value $V_f$ of the signal line voltage obtained by Expression (2) is the predicted value at the timing when the signal line connection device 15 is turned off in step S8 in the case that $V_f$ is determined not to be equal to the predetermined value B. If time $T_x$ is made shorter, the predicted value $V_f$ of the signal line voltage can be obtained with higher accuracy; however, the timing when the signal line connection device 15 is turned off in step 8 becomes later than the timing when the signal line voltage is predicted to become $V_f$, whereby the signal line voltage may reach an abnormal value, and the first communication may not be performed normally. For this reason, it is preferable for the time $T_x$ to be defined as above Expression (4).

Because an appropriate value (predetermined value B) of the signal line voltage depends on the state of the communication (connection/non-connection of the charging cable 2, possibility of charging the battery 10, and the like) of the first communication device 11, the values of the upper limit $V_{max}$ and the lower limit $V_{min}$, of the allowable range with respect to the predetermined value B are changed accordingly. For example, in the state where the charging cable 2 is connected, values are set as $V_{min}$=8 V and $V_{max}$=10 V; and in the state where charging is possible, $V_{min}$=5 V and $V_{max}$=7 V, for example.

The values of $V_{min}$ and $V_{max}$ may be previously stored in the charging control device 13; instead, if the first communication device 11 has a function to supply voltages corresponding to the $V_{min}$ and $V_{max}$, the charging control device 13 may obtains the voltages. In the present embodiment, the charging control device 13 previously stores the values of $V_{min}$ and $V_{max}$ for each of the states of the communication of the first communication device 11.

According to the charging communication system according to the present embodiment, when the second communication device 12 equipped in the electric vehicle 1 is connected to the signal line and when the signal line voltage is predicted to have an abnormal value (the voltage with which the first communication cannot be performed normally), the charging control device 13 turns off the signal line connection device 15 to disconnect the second communication device 12 from the signal line. With this arrangement, for example, in the case that the charging equipment 3 is not compliant with the second communication, the second communication device 12 is prevented from being connected to the signal line and the first communication device 11 from being unable to be performed normally.

In order to determine whether to connect the second communication device 12 to the signal line or not, the signal line voltage only has to be monitored for a certain period of time (for example, 1 to 2 ms) after the charging control device 13 turns on the signal line connection device 15. The signal line voltage can be obtained by using the first communication device 11. Therefore, the charging control device 13 according to the present embodiment does not need costly microcomputers, sensor devices, or the like to be added, and can be easily realized at low cost.

In the above description, the predicted value calculation of the signal line voltage in step S6 of FIG. 3 is necessarily performed in a certain period of time after the signal line connection device 15 is turned on; however, the calculation may be performed only when the signal line voltage gets away from the predetermined value B by a certain value (for example, away from the predetermined value B by 0.5 V or more) after the signal line connection device 15 is turned on. In this case, the predicted value calculation of the signal line voltage is performed only when the value of the signal line voltage is likely to become abnormal. With this arrangement, not only the accuracy of the determination process in step S6 can be expected to be improved, but an effect of reducing the power of the charging control device 13 can be obtained, compared to the case that a high-speed operational process is necessarily performed after the signal line connection device 15 is turned on.

<Embodiment 2>

In the case that the signal used for the communication (first communication) of the first communication device 11 is a signal in which H-level and L-level are repeated in turns like a PWM, the timing (the timing when the signal line connection device 15 is turned on) when the second communication device 12 is connected to the signal line is in any one of a period when the signal voltage is at H-level, a period when the signal voltage is at L-level, a period of transition (raising) from L-level to H-level, and a period of transition (falling) from H-level to L-level.

In particular, in the PWM communication, the L-level voltage VL (in other words, the signal line voltage) and a duty ratio D, which is a ratio between the period of H-level of the signal and the period of L-level of the signal, are important. As described in Embodiment 1, the signal line voltage in the control pilot communication represents the state of communication (connection/non-connection of the charging cable 2, possibility of charging the battery 10, and the like) of the first communication device 11, and the duty ratio D represents the value of the electric current which the charging equipment 3 can supply, whether communication other than the communication performed by the first communication device 11 is used, and the like.

Here, when the time needed for the signal to transit from L-level to H-level (rise time) of the signal is $T_{UP}$, the time needed for the signal to transit from H-level to L-level (fall time) is $T_{DOWN}$, the period when the signal is maintained at H-level (H-level period) is $T_H$, and the period when the signal is maintained at L-level (L-level period) is $T_L$, the duty ratio D is expressed by the following Expression (5):

$$D=\{(T_H-T_{UP})/(T_H+(T_L-T_{DOWN}))\} \qquad \text{Expression (5)}$$

When the rise time $T_{UP}$ is large, the duty ratio D is small, and when the fall time $T_{DOWN}$ is large, the duty ratio D is large.

In the case that the communication (first communication) performed by the first communication device 11 is the PWM communication, when the second communication device 12 is connected to the signal line of the first communication, there may be a change not only in the signal voltage but in the duty ratio D between before and after the connection. When the duty ratio D is greatly changed, the first communication cannot be normally performed, and as a result the charging of the battery 10 cannot be normally performed. Embodiment 2 proposes a charging control device 13 which can solve this issue.

Figure 4:
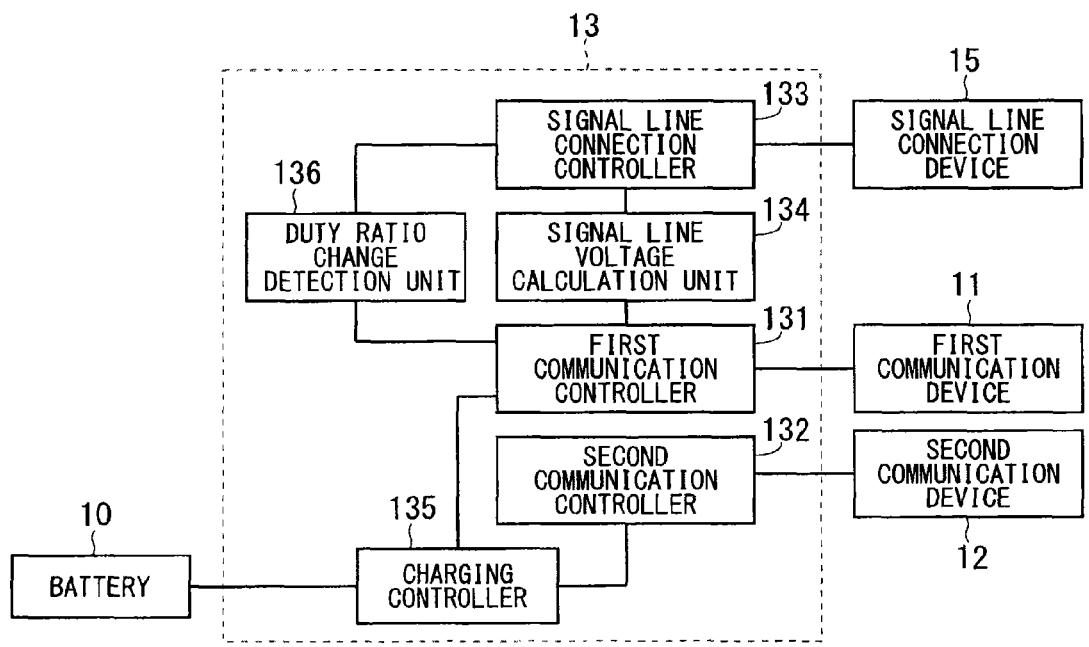
FIG. 4 is a block diagram showing a configuration of a charging communication device according to Embodiment 2.

FIG. 4 is a block diagram showing a configuration of the charging control device 13 according to Embodiment 2. The charging control device 13 is configured by adding a duty ratio change detection unit 136 to the configuration of FIG. 2. The duty ratio change detection unit 136 has a function to detect the change in the duty ratio D between before and after a second communication device 12 is connected to the signal line. The duty ratio change detection unit 136 obtains the rise time $T_{UP}$, the fall time $T_{DOWN}$, the H-level period $T_H$, and the L-level period $T_L$ of the signal of the first communication both of before and after the signal line connection device 15 is turned on, and calculates the duty ratios D and the amount of change (difference) between the duty ratios D.

Figure 5:
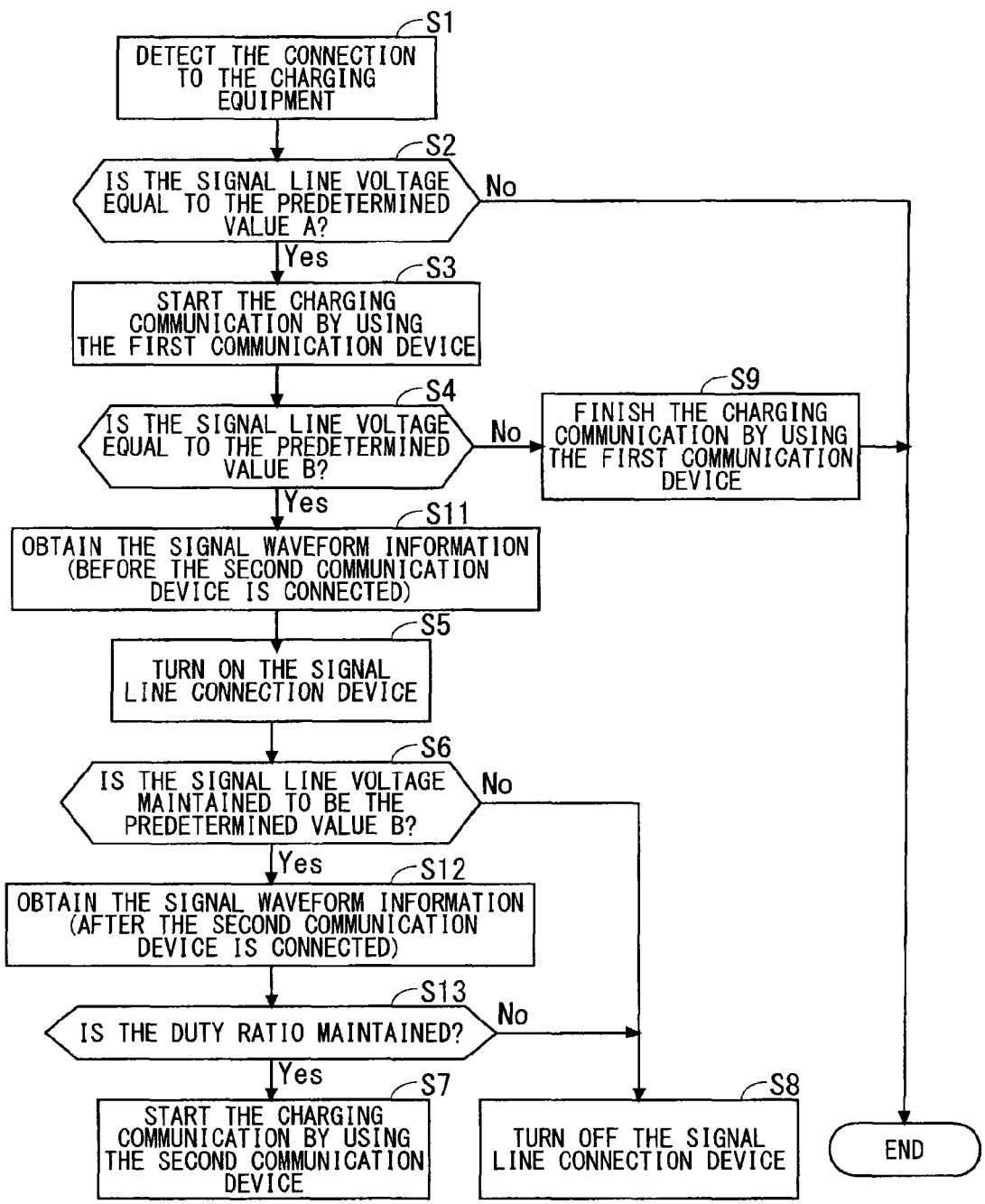
FIG. 5 is a flowchart showing an operation of a charging control device according to Embodiment 2.

FIG. 5 is a flowchart of the operation when the second communication device 12 of the charging control device 13 of the present embodiment is connected to the signal line. In the drawing, the same steps as in the flowchart of FIG. 3 are assigned the same reference numerals.

In the flowchart of FIG. 5, step S11 for obtaining the waveform information (signal waveform information) of the signal used for the first communication is added to the flowchart of FIG. 3, immediately before step S5 for turning on the signal line connection device 15 (connecting the second communication device 12 to the signal line).

In addition, immediately after the signal line connection device 15 is turned on (after the signal line voltage is determined, in step S6, to be maintained to the predetermined value B), the following steps are added: step S12 for obtaining again the signal waveform information of the first communication; and step S13 for determining existence or non-existence of the change in the duty ratio from the pieces of signal waveform information each obtained in steps S11 and S12. The steps other than these steps S11 to S13 are the same as the steps described in Embodiment 1, and the description of the steps will be omitted.

In step S11, immediately before the signal line connection device 15 is turned on, the charging control device 13 obtains the signal waveform information of the first communication by using the first communication controller 131. The signal waveform information obtained in step S11 is referred to as "first signal waveform information." The first signal waveform information is stored in the charging control device 13 before the process of step S13 to be described later is finished. The storing medium for storing the information may be anything, for example, a RAM (Random Access Memory) in the charging control device 13; however, a storing medium which does not have a large delay time (for example, several hundred microseconds to a millisecond) in accessing information stored therein should be used.

The signal waveform information can be obtained by monitoring the signal line voltage at a cycle of several nanoseconds to several microseconds by using, for example, an AD converter. The period from when the signal voltage starts to rise from an L-level voltage until when the signal voltage reaches a predetermined H-level voltage is obtained as the rise time $T_{UP}$. The period from when the signal line voltage reaches the H-level voltage until when the signal line voltage starts to fall down is obtained as the H-level period $T_H$. The period from when the signal line voltage starts to fall down from the H-level voltage until when the signal line voltage reaches the L-level voltage is obtained as the fall time $T_{DOWN}$. The period from when the signal line voltage falls down to L-level voltage until when the signal line voltage starts to rise again is obtained as the L-level period $T_L$.

Further, in step S12 the charging control device 13 obtains the signal waveform information of the first communication immediately after the signal line connection device 15 is turned on. The step S12 is performed at a time different from that of step S11, but the content of processing of step S12 is the same as that of step S11. Hereinafter, the signal waveform information obtained in step S12 is referred to as "second signal waveform information."

In step S13, a duty ratio D1 and a duty ratio D2 are calculated, by using Expression (5), from the first signal waveform information obtained in step S11 and the second signal waveform information obtained in step S12, respectively, and both are compared. Thus, it is determined whether the signal duty ratio is maintained between before and after the signal line connection device 15 is turned on (between before and after the second communication device 12 is connected to the signal line). Specifically, the difference is calculated between the duty ratio D1 based on the first signal waveform information and the duty ratio D2 based on the second signal waveform information, and if the difference is within a predetermined range (for example, within ±3% of the duty ratio D1), it is determined that the duty ratio has not changed.

If it is determined that the duty ratio has not changed between before and after the signal line connection device 15 is turned on, the charging communication (second communication) by the second communication device 12 starts (step S7); however, if it is determined that the duty ratio has changed, the charging control device 13 turned off the signal line connection device 15 to disconnect the second communication device 12 from the signal line (step S8).

As described above, in the present embodiment, even in the case that the signal line voltage does not change from the predetermined value B between before and after the signal line connection device 15 is turned on, when the change in the signal duty ratio is large, the second communication device 12 is disconnected from the signal line to secure the normal communication of the first communication device 11. For example, even in the case that the charging equipment 3 is compliant with the second communication, when the connection of the second communication device 12 to the signal line largely affects the signal waveform of the first communication, there will be a problem that the first communication is disturbed; however, the present embodiment can prevent the problem from occurring. Because the normal charging communication of the first communication device 11 is secured, and high reliability of the charging communication system is assured.

As described above, in the charging communication of the first communication device 11, the signal duty ratio represents the maximum supply current value of the charging equipment 3. Thus, if the amount of change in the duty ratio caused by the turning on of the signal line connection device 15 is within an allowable range and if the signal line connection device 15 is maintained to be on, the maximum supply current value of the charging equipment 3 is informed to the electric vehicle 1 as a value slightly different from the real value.

In the present embodiment, because the amount of change (difference), in the signal duty ratio of the first communication, between before and after the signal line connection device 15 is turned on is obtained, this difference may be used to correct the duty ratio (in other words, the maximum supply current value) of the signal received by the first communication device 11 in the state where the second communication device 12 is connected to the signal line. To be specific, the charging control device 13 may calculate the difference of the duty ratio between before and after the signal line connection device 15 is turned on, and battery 10 may be charged with the current of the value corresponding to the value in which the difference is added to the signal duty ratio received by the first communication device 11. An error in the duty ratio caused by the turning on of the signal line connection device 15 is corrected, and the stability of the process of charging the battery 10 is accordingly improved.

<Embodiment 3>

In Embodiments 1 and 2, the timing when turning on the signal line connection device 15 is not particularly specified; however, in the case that the signal line connection device 15 is realized by, for example, a mechanical switch, a noise may be created on the signal line by chattering at the time of switching (switching between on and off). In particular, when the signal line connection device 15 is turned on during the H-level period or a level transition period (a rising period or a falling period) of the signal, there is a possibility that a drastic change in the signal voltage occurs. In this case, it is impossible to precisely determine whether the signal line voltage is maintained between before and after the signal line connection device 15 is turned on (step S6), and there is a possibility that the signal line voltage is erroneously determined not to be maintained to the predetermined value B because of, for example, the change in voltage caused by a noise. For this reason, the timing when the signal line connection device 15 is turned on is preferably in the L-level period of the signal on the signal line.

In the present embodiment, there is proposed a charging control device 13 in which the timing when the signal line connection device 15 is turned on is optimized so that the change in the signal line voltage caused by a noise at the time of turning on of the signal line connection device 15 can be reduced.

Figure 6:
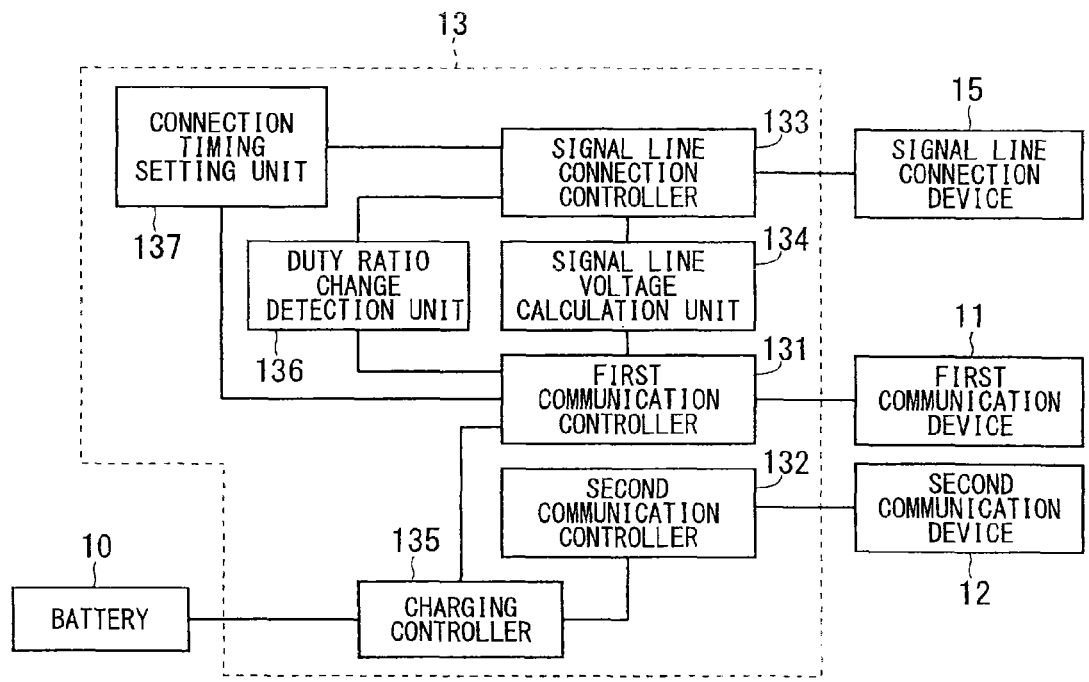
FIG. 6 is a block diagram showing a configuration of a charging communication device of Embodiment 3.

FIG. 6 is a block diagram showing a configuration of the charging control device 13 according to Embodiment 3. The charging control device 13 is configured by additionally providing a connection timing setting unit 137 to the configuration of FIG. 4.

The connection timing setting unit 137 has a function to set an appropriate timing (here, the L-level period of the signal) of turning on the signal line connection device 15.

Here, the operation of the charging control device 13 of Embodiment 3 is basically the same as that of Embodiment 1 (FIG. 3) or Embodiment 2 (FIG. 5); however, the operation (step S5) of turning on the signal line connection device 15 is performed at the timing set by the connection timing setting unit 137. For this reason, the whole operation of the charging control device 13 is not described here, and the operation of determining the timing when the connection timing setting unit 137 turns on the signal line connection device 15.

The connection timing setting unit 137 obtains the signal voltage and the signal waveform information of the signal on the signal line from the first communication device 11, predicts a level change in the signal from these pieces of information, obtains the time $T_c$ which will belong to the L-level period of the signal, and determines the time $T_c$ as the time when the signal line connection device 15 will be turned on. Here, the time $T_c$ represents the elapsed time from the time $T_0$ when the first communication device 11 has obtained the signal voltage. Here, it is considered that a delay time is not generated (or shall be negligible) in communication of information between the components in the charging control device 13.

Here, the time needed for the charging control device 13 to obtain the signal voltage and the signal waveform information from the first communication device 11 is $T_{d1}$, the time needed for the connection timing setting unit 137 to calculate the time $T_c$ is $T_{d4}$, the time needed for the signal line connection device 15 to be turned on is $T_{d5}$. In this case, the time when the charging control device 13 can turn on the signal line connection device 15 after calculating the time $T_c$ based on the signal voltage obtained at the time $T_0$ is at earliest after a delay time $T_y$ later than the time $T_0$, where the delay time $T_y$ is calculated by the following Expression (6).

$$T_y = T_{d1} + T_{d4} + T_{d5} \qquad \text{Expression (6)}$$

Therefore, the time $T_c$ when the signal line connection device 15 is turned on needs to be set at the time when the delay time $T_y$ or more has elapsed after the time $T_0$. In other words, the time $T_c$ needs to satisfy the following Expression (7).

$$T_c \geq T_0 + T_y \qquad \text{Expression (7)}$$

Below, a specific example of how to set the time $T_c$ when the signal line connection device 15 is turned on will be described. In the present embodiment, in order to reduce the noise at the time when the signal line connection device 15 is turned on, the time $T_c$ is set to be in the L-level period of the signal.

If the time $T_0$ when the first communication device 11 obtains the signal voltage is in the H-level period of the signal, the time $T_c$ is set to be the time immediately after the signal becomes L-level again. A time $T_{HL}$ from the time $T_0$ until when the signal becomes L-level can be calculated from the signal waveform information obtained by the first communication device 11. To be specific, the time $T_{HL}$ has a value calculated by subtracting the elapsed time from when the signal becomes H-level until the time $T_0$ from the sum of the H-level period $T_H$ and the fall time $T_{DOWN}$. For example, if the time $T_0$ is immediately after the signal rises to H-level, the time $T_{HL}$ is substantially equal to the sum of the H-level period $T_H$ and the fall time $T_{DOWN}$ ($T_{HL} \approx T_H + T_{DOWN}$).

In this case, in the case that the relationship $T_{HL} < T_y$ is satisfied, when the delay time $T_y$ elapses from the time $T_0$, the signal has already become L-level; thus, the time $T_c$ can be set as $T_c = T_0 + T_y$. To the contrary, if the relationship $T_{HL} \geq T_y$ is satisfied, it is necessary to wait for the signal to become L-level, and the time $T_c$ is thus set as $T_c = T_0 + T_{HL}$.

Alternatively, if the time $T_0$ is in the L-level period of the signal, the time $T_c$ is set to be the time before the signal starts to rise to H-level or immediately after the signal returns to L-level. The time $T_{LH}$ from the time $T_0$ until when the signal starts to rise can be calculated from the signal waveform information obtained by the first communication device 11. In other words, the time $T_{LH}$ has a value calculated by subtracting the elapsed time from when the signal becomes L-level until the time $T_0$ from the L-level period $T_L$.

In this case, if the relationship $T_{LH} > T_y$ is satisfied, the signal is still maintained to be L-level even when the delay time $T_y$ has elapsed from the time $T_0$; thus, the time $T_c$ can be set as $T_c = T_0 + T_y$. To the contrary, if the relationship $T_{LH} \leq T_y$ is satisfied, because it is necessary for the signal to become once H-level and return to L-level again, the time $T_c$ is set as $T_c = T_0 + T_{LH} + T_{UP} + T_H + T_{DOWN}$ ($T_{UP}$ is the rise time of the signal, $T_H$ is the H-level period, and $T_{DOWN}$ is the fall time).

The above-described times $T_{HL}$ and $T_{LH}$ may be calculated by the charging control device 13 (connection timing setting unit 137) or may be calculated by the first communication device 11 and may be informed to the charging control device 13.

According to the present embodiment, the signal line connection device 15 can be turned on during the L-level period of the signal, thereby controlling noises to be created on the signal line. As a result, the charging control device 13 can precisely determine whether the signal line voltage is maintained between before and after the signal line connection device 15 is turned on (step S6). In addition, an effect that a malfunction in the charging communication of the first communication device 11 can be prevented from being caused by the noise is obtained.

<Embodiment 4>

In Embodiments 1 to 3, after turning on the signal line connection device 15 to connect the second communication device 12 to the signal line, if the first communication (PWM communication) of the first communication device 11 cannot be normally maintained (the duty ratio of the signal line voltage or the signal cannot be maintained), the signal line connection device 15 is returned to the off state to disconnect the second communication device 12 from the signal line. The situation in which the connection of the second communication device 12 to the signal line prevents the first communication from being normally maintained is the situation in which the electric vehicle 1 and the charging equipment 3 cannot set the input/output strength adjustment (impedance matching of communication) of the first communication and the second communication within the range defined by the specification or the standard.

As a major cause for the occurrence of the situation, there are two cases: while the electric vehicle 1 has a means (first communication device 11) for performing the first communication and a means (second communication device 12) for performing the second communication, the charging equipment 3 has only a means for performing the first communication; and to the contrary, while the electric vehicle 1 has only a means for performing the first communication, the charging equipment 3 has both of a means for performing the first communication and a means for performing the second communication. In these cases, even if the signal line connection device 15 is turned on, the second communication is not performed.

To address this issue, in Embodiment 4, there is proposed a charging communication system for checking, before turning on the signal line connection device 15, whether both of the electric vehicle 1 and the charging equipment 3 have a means for performing the first communication and a means for performing the second communication, and for allowing the signal line connection device 15 to be turned on only when both of the electric vehicle 1 and the charging equipment 3 have the means.

As a precondition of the present embodiment, it is defined, if the charging equipment 3 has both of the a means for performing the first communication and a means for performing the second communication, that the signal (PWM signal) of the first communication is maintained to a duty ratio $D_{NA}$ (for example, 5%) which prohibits the charging of the battery 10 for a certain period of time (several seconds to several minutes) after the electric vehicle 1 is connected, in order to wait for the second communication to start. Then, if the second communication is started within the certain period of time, the charging of the battery 10 is performed by using the various types of information obtained by the second communication (for example, the charging in consideration of charging cost and the like); and if the second communication is not started within the certain period of time, the charging of the battery 10 is performed by using only the information obtained by the first communication (for example, continuous charging). When the charging of the battery 10 is to start, the signal duty ratio of the first communication is changed from $D_{NA}$ to the duty ratio $D_A$ (for example, 10% to 90%) which allows the battery 10 to be charged.

Further, in the state where the electric vehicle 1 is not connected to the charging equipment 3, the signal line connection device 15 is always kept off.

Figure 7:
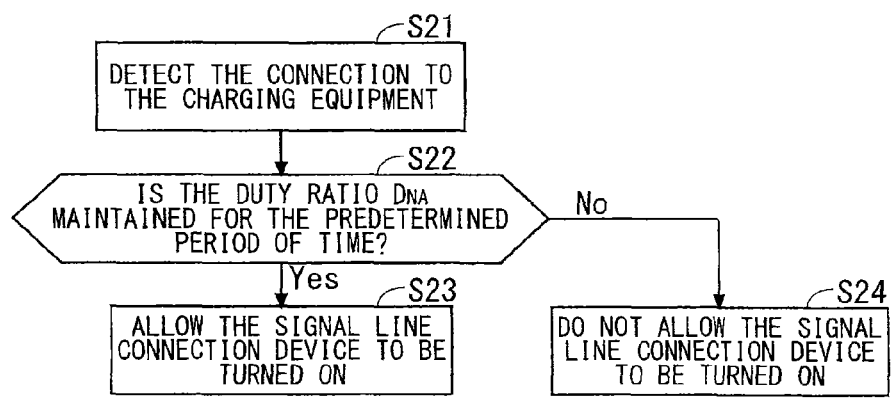
FIG. 7 is a flowchart showing an operation of a charging communication device according to Embodiment 4.

FIG. 7 is a flowchart showing an operation of a charging control device 13 according to Embodiment 4. When the electric vehicle 1 is connected to the charging equipment 3 through the charging cable 2, the charging control device 13 detects the connection to the charging equipment 3 from the change in the signal line voltage (step S21). When the charging control device 13 detects the connection to the charging equipment 3, the charging control device 13 obtains the signal waveform information of the first communication by using the first communication controller 131 to check whether the duty ratio of the PWM signal is maintained to the above-described $D_{NA}$ for a predetermined period of time (several hundred milliseconds to several seconds) (step S22).

If the duty ratio of the PWM signal is maintained to DNA for the predetermined period of time (step S22: YES), the charging control device 13 determines that the charging equipment 3 is waiting for the second communication to start (in other words, the charging equipment 3 has a means for performing the second communication), and allows the signal line connection device 15 to be turned on (the connection of the second communication device 12 to the signal line) (step S23). In this case, the operation of FIG. 2 described in Embodiment 1 and the operation of FIG. 5 described in Embodiment 2 are performed as described above.

On the other hand, if the duty ratio of the PWM signal is not maintained to $D_{NA}$ for the predetermined period of time (step S22: NO), the charging control device 13 determines that the charging equipment 3 does not have a means for performing the second communication, and does not allow the signal line connection device 15 to be turned on (step S24). In this case, for example, in performing the operation of FIG. 3, if the determination of YES is made in step S4, the process jumps to step S8. Similarly, in performing the operation of FIG. 5, if the determination YES is made in step S4, the process jumps to step S8.

With the present embodiment, because the charging control device 13 can determine, without turning on the signal line connection device 15, whether the charging equipment 3 has a means for performing the second communication, the charging control device 13 can perform the first communication more stably, whereby the reliability of the charging operation of the battery 10 is improved.

<Embodiment 5>

In Embodiment 5, there is proposed another aspect of the charging communication system in which the signal line connection device 15 is allowed to be turned on only when both of the electric vehicle 1 and the charging equipment 3 have a means for performing the first communication and a means for performing the second communication.

Figure 8:
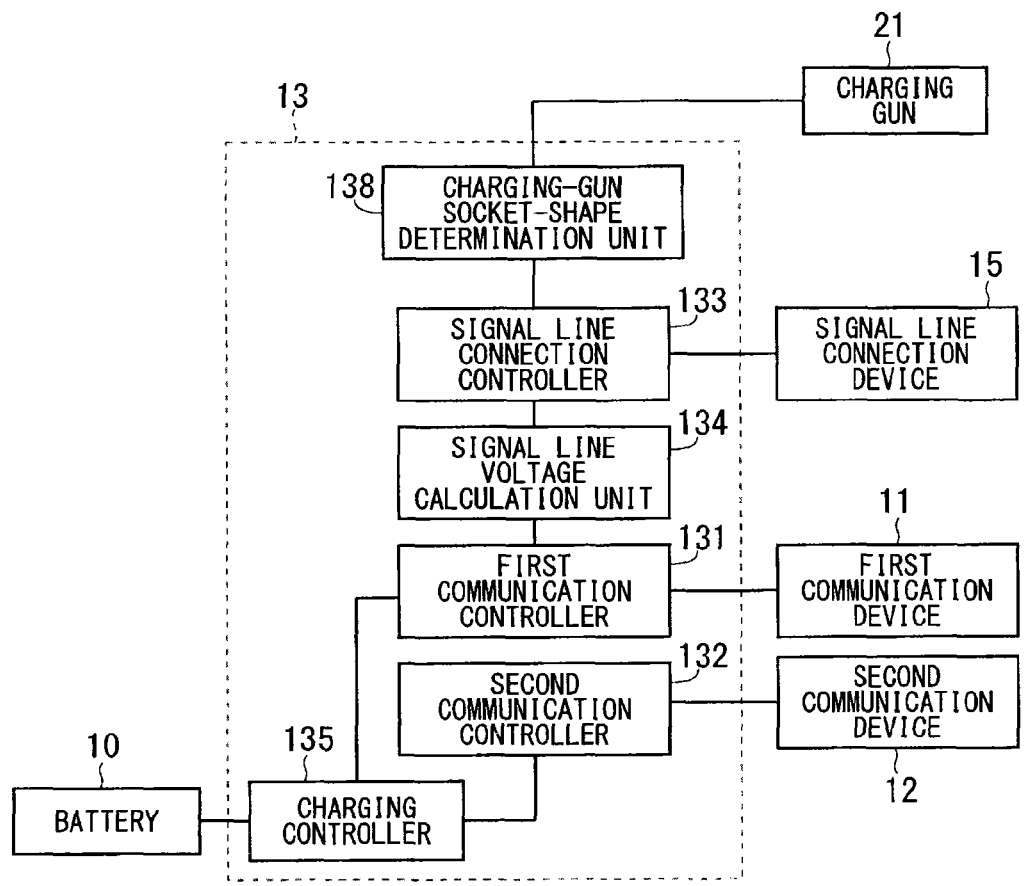
FIG. 8 is a block diagram showing an operation of a charging communication device according to Embodiment 5.

FIG. 8 is a block diagram showing an operation of a charging control device 13 according to Embodiment 5. The charging control device 13 is configured by providing a charging-gun socket-shape determination unit 138 to the configuration of FIG. 2. The charging-gun socket-shape determination unit 138 has a function to recognize the socket shape of a charging gun 21 disposed at the end portion of the charging cable 2 of the charging equipment 3 and to determine whether the shape of the charging gun 21 is compatible to the standard (for example, the CHAdeMO standard, the SAE standard, and the like) compliant with the second communication. If the charging gun 21 is compliant with the second communication, it is determined that the charging equipment 3 has both of a means for performing the first communication and a means for performing the second communication.

Also in the present embodiment, when the electric vehicle 1 is not connected to the charging equipment 3, the signal line connection device 15 is always set off.

Although FIG. 8 shows a configuration in which the charging-gun socket-shape determination unit 138 is applied to the charging control device 13 of Embodiment 1 (FIG. 2), the charging-gun socket-shape determination unit 138 can be applied to the charging control devices 13 of Embodiments 2 and 3 (FIGS. 4 and 6).

Figure 9:
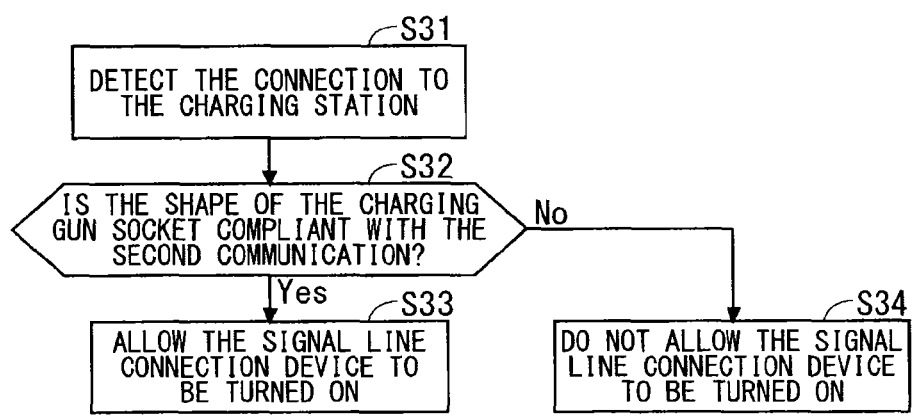
FIG. 9 is a flowchart showing an operation of a charging communication device according to Embodiment 5.

FIG. 9 is a flowchart showing an operation of the charging control device 13 according to Embodiment 5. When the electric vehicle 1 is connected to the charging equipment 3 through the charging gun 21 and the charging cable 2, the charging control device 13 detects the connection to the charging equipment 3 from the change in the signal line voltage (step S31). When the charging control device 13 detects the connection to the charging equipment 3, the charging control device 13 determines, by using the charging-gun socket-shape determination unit 138, whether the shape of the charging gun 21 is compliant with the second communication (step S32).

If the shape of the charging gun 21 is compliant with the standards corresponding to the second communication (step S32: YES), the charging control device 13 determines that the charging equipment 3 has a means for performing the second communication, and accordingly allows the signal line connection device 15 to be turned on (the connection of the second communication device 12 to the signal line) (step S33). In this case, the operation of FIG. 2 described in the Embodiment 1 and the operation of FIG. 5 described in Embodiment 2 are performed as described above.

On the other hand, if the shape of the charging gun 21 is not compliant with the standards corresponding to the second communication (step S32: NO), the charging control device 13 determines that the charging equipment 3 does not have a means for performing the second communication, and accordingly does not allow the signal line connection device 15 to be turned on (step S34). In this case, for example, when performing the operation of FIG. 2, if the determination of YES is made in step S4, the process jumps to step S8. Similarly, when performing the operation of FIG. 5, if the determination of YES is made in step S4, the process jumps to step S8.

With the present embodiment, because the charging control device 13 can determine, without turning the signal line connection device 15, whether the charging equipment 3 has a means for performing the second communication, the charging control device 13 can perform the first communication more stably, whereby the reliability of the charging operation of the battery 10 is improved. In addition, the present embodiment also has an advantage that the embodiment can be realized at lower cost than Embodiment 4.

<Modified Example>

Embodiments 1 to 3 described the charging communication systems in which the means, (second communication device 12) provided on the electric vehicle 1, for performing the second communication is connected to the signal line, and if the first communication cannot be normally performed, the means is disconnected from the signal line; however, the present invention can be applied to the case that the means, provided on the charging equipment 3, for performing the second communication is connected to the signal line.

For example, Embodiment 1 may be applied to the charging equipment 3 such that on the charging equipment 3 there is provided a means (corresponding to the signal line voltage calculation unit 134) for calculating the amount of change in the signal line voltage between before and after a means for performing its own second communication is connected to the signal line; and if the amount of change in the signal line voltage does not fall within an allowable range, the means for performing the second communication may be disconnected from the signal line.

Alternatively, Embodiment 2 may be applied to the charging equipment 3 such that on the charging equipment 3 there is provided a means (corresponding to the duty ratio change detection unit 136) for calculating the amount of change in the duty ratio of the PWM signal between before and after a means for performing its own second communication is connected to the signal line; and if the amount of change in the duty ratio does not fall within an allowable range, the means for performing the second communication may be disconnected from the signal line.

As described above, if the present invention is applied to the charging equipment 3, in the case that the electric vehicle 1 has only a means for performing the first communication and that the charging equipment 3 has both of a means for performing the first communication and a means for performing the second communication, it can be prevented that the first communication fails in keeping a normal connection.

Here, the embodiments of the present invention may be optionally combined, may be deformed, or may be omitted, appropriately, within a spirit of the invention, if necessary.

DESCRIPTION OF THE NUMERALS

1: Electric vehicle
2: Charging cable
3: Charging equipment
10: Battery
11: First communication device
12: Second communication device
13: Charging control device
14: Signal line load controller
15: Signal line connection device
21: Charging gun
131: First communication controller
132: Second communication controller
133: Signal line connection controller
134: Signal line voltage calculation unit
135: Charging controller
136: Duty ratio change detection unit
137: Connection timing setting unit
138: Charging-gun socket-shape determination unit

The invention claimed is:

1. A charging equipment capable of charging a battery on an electrically powered vehicle, the charging equipment comprising:
- a charging cable configured to be connected, when charging said battery, between said electrically powered vehicle and said charging equipment;
- a first communication unit configured to communicate with said electrically powered vehicle by a first communication method by using a signal line in said charging cable;
- a second communication unit configured to communicate with said electrically powered vehicle by a second communication method by using said signal line;
- a signal line connector configured to switch connection and disconnection between said second communication unit and said signal line; and
- a signal line voltage calculator configured to calculate an amount of change in a signal line voltage which is a voltage on said signal line between before and after said signal line connector connects said second communication unit to said signal line,
- wherein said signal line connector disconnects, when said amount of change in said signal voltage does not fall within a predetermined allowable range, said second communication unit from said signal line.

2. The charging equipment of claim 1, wherein said charging equipment predicts a level change of said signal on said signal line and sets a timing at which said signal line connector connects said second communication unit to said signal line to be within a period of time in which a level of said signal becomes a predetermined value.

3. Charging equipment capable of charging a battery on an electrically powered vehicle, the charging equipment comprising:
- a charging cable configured to be connected, when charging said battery, between said electrically powered vehicle and said charging equipment;
- a first communication unit configured to communicate with said electrically powered vehicle by a first communication method by using a signal line in said charging cable;
- a second communication unit configured to communicate with said electrically powered vehicle by a second communication method by using said signal line;
- a signal line connector configured to switch connection and disconnection between said second communication unit and said signal line; and
- a duty ratio change detector configured to calculate an amount of change in a duty ratio of a signal on said signal line between before and after said signal line connector connects said second communication unit to said signal line,
- wherein said signal line connector disconnects, when said amount of change in said duty ratio does not fall within a predetermined allowable range, said second communication unit from said signal line.

4. The charging equipment of claim 3, wherein said charging equipment predicts a level change of said signal on said signal line and sets a timing at which said signal line connector connects said second communication unit to said signal line to be within a period of time in which a level of said signal becomes a predetermined value.

5. A charging equipment capable of charging a battery on an electrically powered vehicle, the charging equipment comprising:
- a charging cable configured to be connected, when charging said battery, between said electrically powered vehicle and said charging equipment;
- a first communication unit configured to communicate with said electrically powered vehicle by a first communication method by using a signal line in said charging cable; and
- a second communication unit configured to communicate with said electrically powered vehicle by a second communication method by using said signal line,
- wherein said charging equipment, after said electrically powered vehicle is connected, starts charging said battery by using said second communication method when a communication by said second communication method starts within a predetermined period of time.

6. The charging equipment of claim 5, wherein said charging equipment, after said charging equipment is connected to said electrically powered vehicle, starts charging said battery by using said first communication method when a communication by using said second communication method is not started.

7. A charging equipment capable of charging a battery on an electrically powered vehicle, the charging equipment comprising:
- a charging cable configured to be connected, when charging said battery, between said electrically powered vehicle and said charging equipment;
- a first communication unit configured to communicate with said electrically powered vehicle by a first communication method by using a signal line in said charging cable; and
- a second communication unit configured to communicate with said electrically powered vehicle by a second communication method by using said signal line,
- wherein said charging equipment, after said charging equipment is connected to said electrically powered vehicle, starts charging said battery by using said first communication method when a communication by using said second communication method is not started.

8. A charging control device comprising:
a charging controller configured to control charging of a battery, based on information obtained from a charging equipment through communication using a signal line in a charging cable for said battery;
a first communication controller configured to obtain information from a first communication device for communicating with said charging equipment by a first communication method by using said signal line;
a second communication controller configured to obtain information from a second communication device for communicating with said charging equipment by a second communication method by using said signal line;
a signal line connection controller configured to control a signal line connection device for switching connection and disconnection between said second communication device and said signal line; and
a signal line voltage calculator configured to calculate an amount of change in a signal line voltage which is a voltage on said signal line between before and after said signal line connection device connects said second communication device to said signal line,
wherein said signal line connection controller causes, when said amount of change in said signal line voltage does not fall within a predetermined allowable range, said signal line connection device to disconnect said second communication device from said signal line.

9. The charging control device of claim 8, wherein after said second communication device is connected to said signal line, said signal line voltage calculator calculates, from a change in said signal line voltage, a predicted value of said signal line voltage after a predetermined period of time, and said signal line connection controller calculates an amount of change in said signal line voltage based on said predicted value of said signal line voltage calculated by said signal line voltage calculator.

10. The charging control device of claim 8, further comprising:
a connection timing setting unit configured to predict a level change of said signal on said signal line and to set a timing at which said signal line connection device connects said second communication device to said signal line to be within a period of time in which a level of said signal becomes a predetermined value.

11. The charging control device of claim 8, wherein said charging control device allows, only when said charging control device determines that said charging equipment has started to wait for a communication by said second communication method to start, said signal line connection device to connect said second communication device to said signal line.

12. A charging control device comprising:
a charging controller configured to control charging of a battery, based on information obtained from a charging equipment through communication using a signal line in a charging cable for said battery;
a first communication controller configured to obtain information from a first communication device for communicating with said charging equipment by a first communication method using a duty ratio of a signal by using said signal line;
a second communication controller configured to obtain information from a second communication device for communicating with said charging equipment by a second communication method by using said signal line;
a signal line connection controller configured to control a signal line connection device for switching connection and disconnection between said second communication device and said signal line; and
a duty ratio change detector configured to calculate an amount of change in a duty ratio of a signal on said signal line between before and after said signal line connection device connects said second communication device to said signal line,
wherein said signal line connection controller causes, when said amount of change in said duty ratio does not fall within a predetermine allowable range, said signal line connection device to disconnect said second communication device from said signal line.

13. The charging control device of claim 12, wherein when said amount of change in said duty ratio falls within said allowable range, said charging controller uses the amount of change to correct a duty ratio of a signal received by said first communication device after said second communication device is connected to said signal line, then controls charging of said battery.

14. The charging control device of claim 12, further comprising:
a connection timing setting unit configured to predict a level change of said signal on said signal line and to set a timing at which said signal line connection device connects said second communication device to said signal line to be within a period of time in which a level of said signal becomes a predetermined value.

15. The charging control device of claim 12, wherein said charging control device allows, only when said charging control device determines that said charging equipment has started to wait for a communication by said second communication method to start, said signal line connection device to connect said second communication device to said signal line.

16. A charging control device comprising:
a charging controller configured to control charging of a battery, based on information obtained from a charging equipment through communication using a signal line in a charging cable for said battery;
a first communication controller configured to obtain information from a first communication device for communicating with said charging equipment by a first communication method using a duty ratio of a signal by using said signal line;
a second communication controller configured to obtain information from a second communication device for communicating with said charging equipment by a second communication method by using said signal line;
a signal line connection controller configured to control a signal line connection device for switching connection and disconnection between said second communication device and said signal line; and
a duty ratio change detector configured to calculate an amount of change in a duty ratio of a signal on said signal line,
wherein said signal line connection controller causes, when said duty ratio is maintained during a predetermined period of time, said signal line connection device to connect said second communication device to said signal line.

17. The charging control device of claim 16, wherein said signal line connection controller does not allow, when said duty ratio is not maintained during a predetermined period of time, said signal line connection device to connect said second communication device to said signal line.

18. A charging control device comprising:
- a charging controller configured to control charging of a battery, based on information obtained from a charging equipment through communication using a signal line in a charging cable for said battery;
- a first communication controller configured to obtain information from a first communication device for communicating with said charging equipment by a first communication method using a duty ratio of a signal by using said signal line;
- a second communication controller configured to obtain information from a second communication device for communicating with said charging equipment by a second communication method by using said signal line;
- a signal line connection controller configured to control a signal line connection device for switching connection and disconnection between said second communication device and said signal line; and
- a duty ratio change detector configured to calculate an amount of change in a duty ratio of a signal on said signal line,
- wherein said signal line connection controller does not allow, when said duty ratio is not maintained during a predetermined period of time, said signal line connection device to connect said second communication device to said signal line.

* * * * *